F. V. HETZEL & H. P. COCHRANE.
ADJUSTABLE CHUTE.
APPLICATION FILED MAR. 15, 1907.
898,886.
Patented Sept. 15, 1908.
2 SHEETS—SHEET 1.
Fig. 7.
Fig. 1.
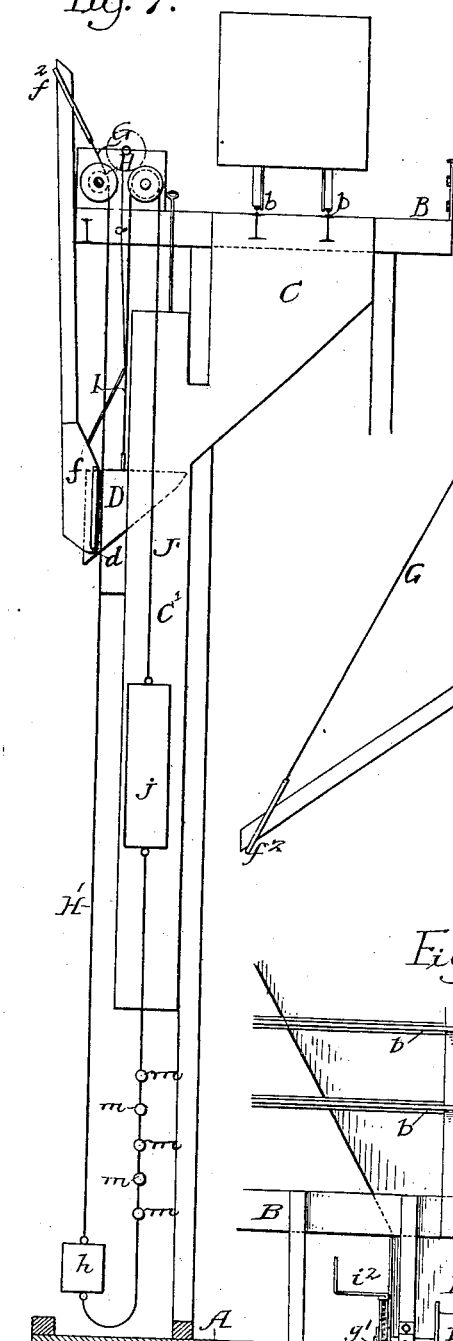
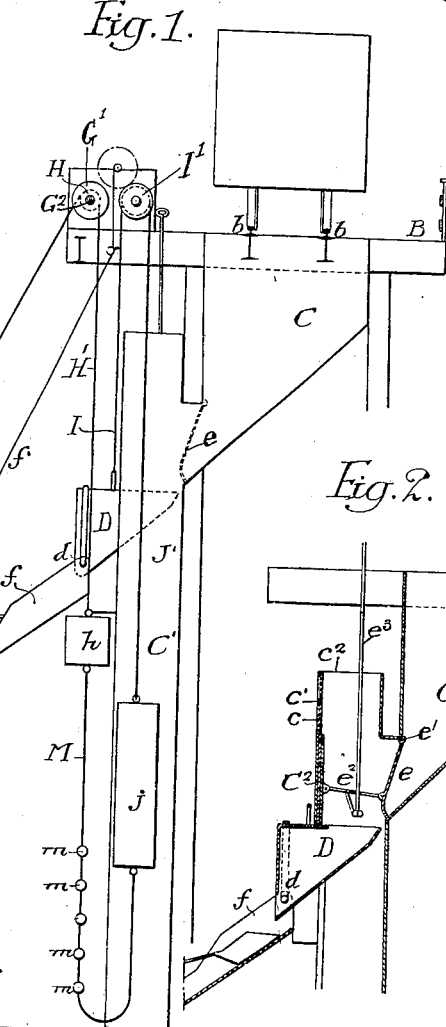
Fig. 2.
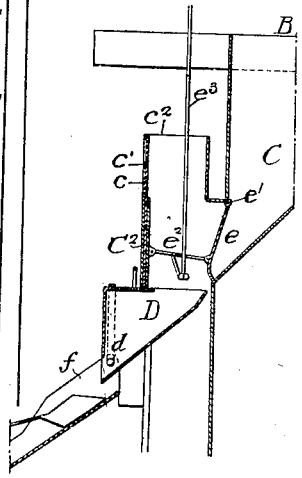
Fig. 3.
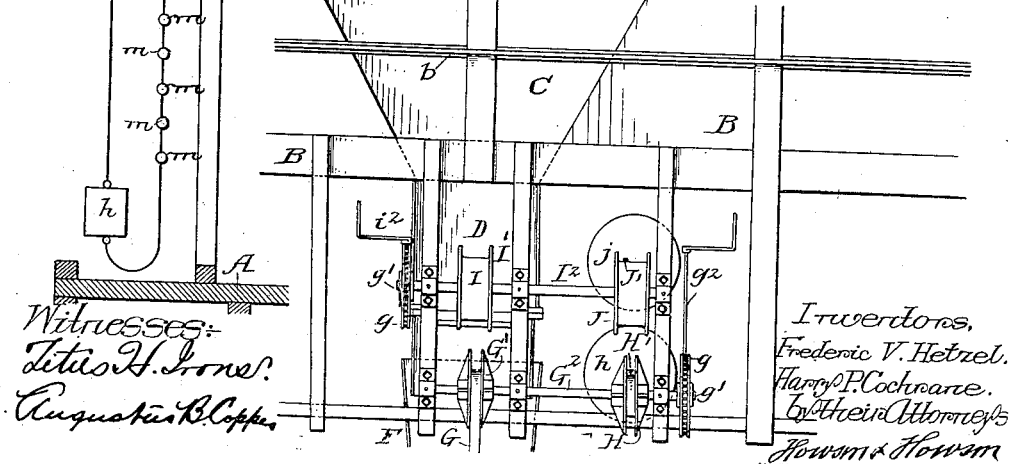
Witnesses:
Titus H. Jones
Augustus B. Copper
Inventors,
Frederic V. Hetzel
Harry P. Cochrane
by their Attorneys
Howson & Howson

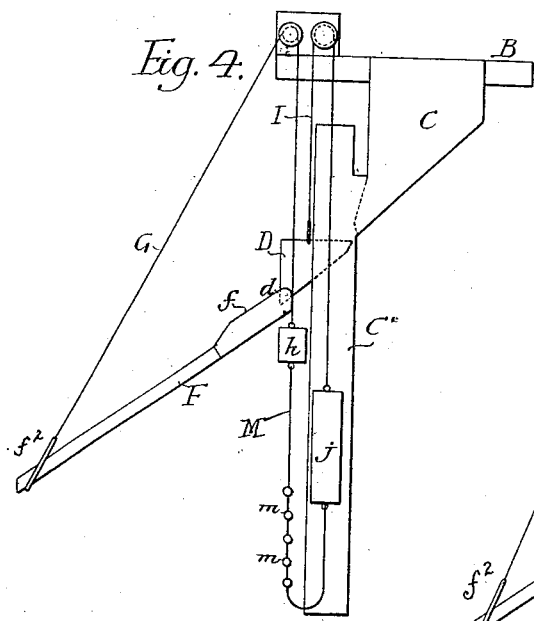
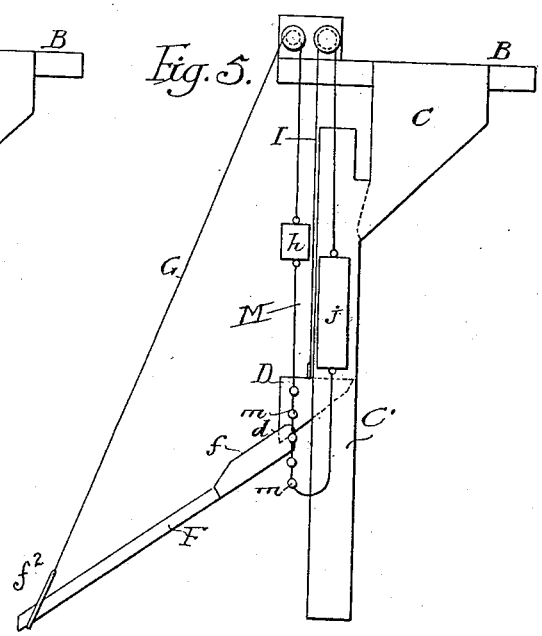
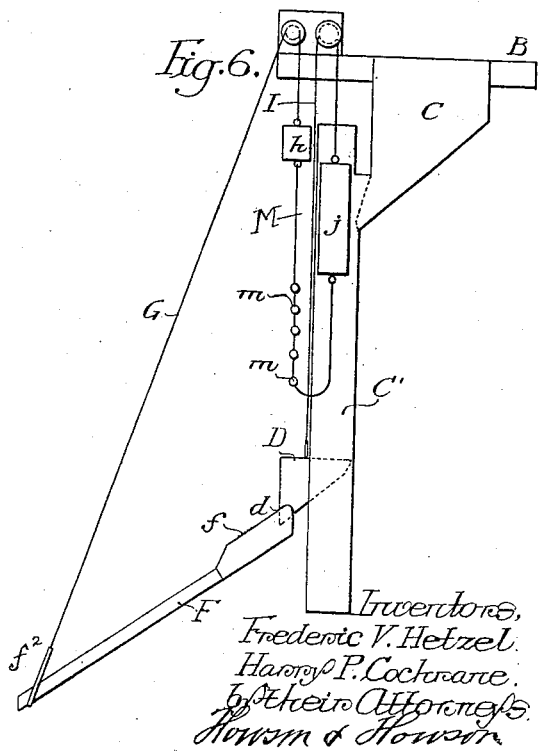

UNITED STATES PATENT OFFICE.

FREDERIC V. HETZEL AND HARRY P. COCHRANE, OF PHILADELPHIA, PENNSYLVANIA, ASSIGNORS TO LINK-BELT COMPANY, OF CHICAGO, ILLINOIS, A CORPORATION OF ILLINOIS.

ADJUSTABLE CHUTE.

No. 898,886.  Specification of Letters Patent.  Patented Sept. 15, 1908.

Application filed March 15, 1907. Serial No. 362,470.

*To all whom it may concern:*

Be it known that we, FREDERIC V. HETZEL and HARRY P. COCHRANE, citizens of the United States, residing in Philadelphia, Pennsylvania, have invented certain Improvements in Adjustable Chutes, of which the following is a specification.

Our invention relates to certain improvements in pivoted chutes and particularly of the type used at piers for loading vessels with coal or other granular material in which the hopper and the chute are vertically adjustable for different heights of vessels or different tides.

The object of the invention is to provide means for more completely counterbalancing the overhanging chute than heretofore, adding to the weight of the counterbalance when the chute is extended and relieving the counterbalance of a portion of the weight when the chute is moved to an upright position.

In the accompanying drawings:—Figure 1, is a view in elevation illustrating a portion of a pier with the overhead structure and chute illustrating our invention; Fig. 2, is a section of a portion of the structure illustrated in Fig. 1; Fig. 3, is a plan view of the hoisting mechanism for the hopper and chute; Figs. 4, 5 and 6, are diagram views, showing the chute and hopper in different positions; Fig. 7, is a view, showing the chute in a raised position.

In the present instance, A is a pier.

B is the structure mounted upon the pier and on which are the rails $b$ of the track which supports the cars of coal or other material to be discharged through the chute.

C is a track hopper directly under the rails $b$—$b$.

C' is a vertical extension of the hopper. This extension is open at the front.

D is a vertically adjustable hopper into which the coal is discharged from the hopper C. This hopper D is adapted to guides in the extension C' and mounted upon the hopper is a series of plates $c$, $c'$ and $c^2$, which close the space above the movable hopper when it is lowered from the position shown in Fig. 2 to the position, for instance, as shown in Fig. 6, preventing the coal escaping over the vertically adjustable hopper.

$C^2$ is a fixed plate arranged directly opposite the opening of the hopper C and $e$ is a gate for closing this opening pivoted at $e'$ and controlled by levers $e^2$ actuated by an operating rod $e^3$. This form of valve mechanism forms no part of our present invention.

Pivoted to the hopper D at $d$ is a chute F, which can be arranged at any angle to deliver coal to a vessel at one side of the pier A.

Mounted on the structure B is a hoisting mechanism for regulating the vertical position of the hopper D and the inclination of the chute F. The fall of material down the chute may be regulated by any suitable gate. In the drawings I have shown a gate $f$ pivoted to the chute and having an arm to which is attached a rope $f'$ extending to the windlass on the structure B, but other types of gates may be used without departing from our invention.

G is a cable running from the end $f^2$ of the chute F to a drum $G'$ on a shaft $G^2$ and on this shaft is a drum H to which is attached a cable H' extending to a counterweight $h$. On the shaft is a worm wheel $g$ with which meshes a worm $g'$ on a hand shaft $g^2$, so that on turning the hand shaft the chute F can be raised and lowered.

In order to vertically adjust the hopper D, we connect a flat rope I to the hopper and pass this around a drum I' on a shaft $I^2$ and on this shaft is a drum J to which is attached a rope J' from which is suspended a counterweight $j$. The shaft $I^2$ is driven by a hand shaft $i^2$ through a worm $g'$ and worm wheel $g$. On turning the shaft the hopper D can be raised and lowered, the worm locking the hopper in the position to which it is adjusted.

In most structures of the type shown the chute F extends a considerable distance from its pivot $d$ and is made very heavy, consequently in the ordinary type of structure it is impossible to properly counterbalance the chute as a weight which would counterbalance the chute when extended as in Fig. 1, would considerably overbalance the chute when in the raised position shown in Fig. 7. Therefore, a weight much lighter than necessary is used and it takes considerable power to adjust the chute.

By our invention, we provide a variable counterbalance weight. When the chute is extended as shown in Fig. 1, the full weight will counterbalance the chute, but when the chute is raised, the counterbalance will be relieved of a portion of its weight. To accomplish this we attach a rope or chain M to the underside of the weight $h$ and to the under side of the weight $j$ and mount a series of weights m on this rope in such positions that when the chute is extended the weights m will add their weight to the counterbalance weight h, but when the chute is raised, as in Fig. 7, these weights m will be suspended from the weight j, which counterbalances the hopper D relieving the counterbalance h of the extra weight. Thus, by this arrangement the shaft $G^2$ can be readily turned and the chute adjusted to any position desired.

By attaching the chain M to the two weights h and j the weights m always remain in the same relative position to the counterweight h no matter in what position the vertically adjustable hopper is in. For instance, the hopper may be in the raised position, as shown in Fig. 4, or it may be in the mid position, as shown in Fig. 5, or in the extreme lower position, as shown in Fig. 6, and while the chute is extended the weights m will always remain suspended from the counterbalance h of the chute and should the chute be raised while the hopper is in any of these positions its weight m will be transferred from the weight h to the weight j.

We claim:—

1. The combination of a vertically adjustable hopper, a chute pivoted to the hopper, a counterweight connected to the chute, a counterweight connected to the hopper, a series of supplemental weights connected to the counterweight of the chute and the counterweight of the hopper, said supplemental weights being so arranged that when the chute is extended the supplemental weights will add their weight to the counterbalance weight of the chute, and when the chute is raised their weight will be transferred to the counterweight of the hopper, substantially as described.

2. The combination of a vertically adjustable hopper, a chute pivoted to the hopper, a counterweight for the chute and a counterweight for the hopper, a series of supplemental weights so arranged in respect to the two counterweights that when the chute is extended they will add their weight to the weight of its counterbalance and when the chute is raised they will add their weight to the counterbalance of the hopper, substantially as described.

3. The combination in apparatus for loading vessels, of a track hopper, a vertically arranged extension of the track hopper, an adjustable hopper mounted in the extension, means for raising and lowering said adjustable hopper, a counterbalance weight for the said hopper, a chute pivoted to the hopper, a counterbalance weight for the chute, a rope attached to two counterbalance weights, a series of supplemental weights on the rope so situated in respect to the said weights that when the chute is lowered the supplemental weights will be added to the weight of the chute counterweight and when the chute is raised the supplemental weight will be added to the counterweight of the hopper, substantially as described.

4. The combination of a structure, a track hopper, a vertical extension of the track hopper, two shafts mounted on the structure, two drums on each shaft, a vertically adjustable hopper mounted on the vertical extension of the track hopper, a rope extending from the adjustable hopper to one of the drums on one shaft, a rope extending from the end of the chute to one of the drums on the other shaft, a chute, a counterweight attached to the other drum on the said chute shaft, and a rope attached to a counterweight and to the drum on the other shaft, means for turning the shafts independently one of the other, a looped rope having an end attached to the underside of each counterweight, a series of supplemental weights on the looped rope so arranged in respect to the said counterweights that when the chute is extended the supplemental weights will be added to the counterweight of the chute and when raised the supplemental weights will be transferred to the weight of the hopper according to the elevation of the chute, substantially as described.

In testimony whereof, we have signed our names to this specification, in the presence of two subscribing witnesses.

FREDERIC V. HETZEL.
HARRY P. COCHRANE.

Witnesses:
WM. A. BARR,
JOS. H. KLEIN.